United States Patent Office 3,432,600
Patented Mar. 11, 1969

3,432,600
PARTIALLY REDUCED 2-(1-NAPTHYLAMINO)
OXAZOLINE, INDANYLETHYLUREAS, AND
INDANYLAMINOOXAZOLINE
John Harvey, Jr., Wilmington, Del., assignor to E. I. du
Pont de Nemours and Company, Wilmington, Del., a
corporation of Delaware
No Drawing. Filed Sept. 30, 1963, Ser. No. 313,756
U.S. Cl. 424—272                                    15 Claims
Int. Cl. A61k 27/00; C07c 127/16; C07d 85/36

This invention relates to partially reduced naphthyl-ureas, partially reduced naphthylaminooxazolines, in-danylureas and indanylaminooxazolines.

More particularly, the compounds of this invention are partially reduced N-(1-naphthyl)-N' - (beta - substituted ethyl)ureas, partially reduced 2-(1-naphthylamino)oxazo-lines, N-(4-indanyl)-N'-(beta-substituted ethyl)ureas, and 2-(4-indanylamino)oxazolines.

The disclosure herein should not be taken as a recommendation to use the disclosed invention in any way without full compliance with U.S. Food and Drug laws and other laws and governmental regulations which may be applicable.

The compounds of this invention are useful regulators of the cardiovascular system e.g., having significant vasoconstrictor activity. They have low toxicity and remarkably good therapeutic ratios, as shown by tests in such higher species as dogs and monkeys.

The partially reduced N-(1-naphthyl)-N'-(beta-substituted ethyl)ureas of this invention have the formula:

(1)
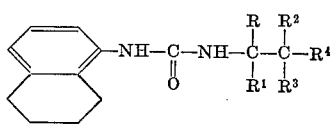

The partially reduced 2-(1-naphthylamino)oxazolines of this invention have the formula:

(2)
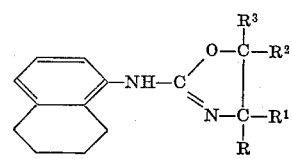

The N-(4-indanyl)-N'-(beta-substituted ethyl)ureas of this invention have the formula:

(3)
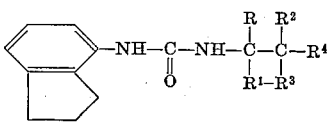

The 2-(4-indanylamino)oxazolines of this invention have the formula:

(4)
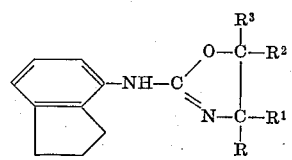

In each of the above Formulas 1 and 2, the substituents R, $R^1$, $R^2$ and $R^3$ can each be hydrogen or an alkyl group of 1 through 4 carbons with the total number of carbons in these 4 substituents being a maximum of 8.

In the above formulas $R^4$ is preferably halogen such as bromine, chlorine or iodine, or it can be an alkylsulfonyloxy group of 1 through 4 carbons such as methanesulfonyloxy or an arylsulfonyloxy group such as p-toluenesulfonyloxy.

The hydrogen atoms of the reduced naphthyl group in the compounds of Formulas 1 and 2 and the hydrogen atoms of the indanyl group in the compounds of Formulas 3 and 4 may be replaced with certain substituents such as halogen, e.g., chlorine, bromine, fluorine and iodine, alkyl of 1–4 carbons, alkoxy of 1–4 carbons, alkylthio of 1–4 carbons, trifluoromethyl and trifluoromethoxy. Up to three such substituents can be present.

The compounds of this invention are generally crystalline solids. Their combination of valuable pharmacological properties including antihypertensive and central nervous system depressant activity, coupled with unexpectedly low toxicity and outstanding high therapeutic ratios at low rates of use, make them a particularly useful class of compounds.

For this combination of properties, it is important that one and only one of the rings in the partially reduced naphthyl group be saturated and the other be unsaturated. It is also important that the urea or aminooxazoline groups be substituted on the unsaturated ring of the reduced naphthyl group and specifically on the 1-position.

The compounds of Formula 1 can be readily prepared by reaction between a reduced 1-naphthylamine and an appropriate alkyl isocyanate. Alternatively, they can be prepared by reaction between a reduced 1-naphthyl isocyanate and an appropriate alkylamine. The compounds of Formula 2 can be prepared from the compounds of Formula 1 by removal of the $R^4$ substituent and ring closure.

Similarly, the compounds of Formula 3 can readily be prepared by reaction between a 4-indanylamine and an appropriate alkyl isocyanate. Alternatively, they can be prepared by reaction between a 4-indanyl isocyante and an appropriate alkylamine. The compounds of Formula 4 can be prepared from the compounds of Formula 3 by removal of the $R^4$ substituent and ring closure.

In the above procedures, the reaction between the amine and isocyanate can conveniently be carried out in a suitable inert organic solvent including both aromatic and aliphatic hydrocarbon solvents. Halogenated, oxygenated or nitrated hydrocargon solvents are useful. Representative are benzene, chloroform, carbon tetrachloride, ethylene dichloride, chlorobenzene, toluene, xylene, nitrobenzene and nitrotoluene. Temperatures of 0° to 110° C. are suitable.

Formation of the aminooxazoline is conveniently carried out by removal of $R^4$ and elimination of hydrogen bromide, hydrogen chloride, hydrogen iodide, methanesulfonic acid, p-toluenesulfonic acid by refluxing the urea in solution in a suitable solvent such as methanol, ethanol, propanol, butanol or preferably water. Since the amino-oxazolines are basic in nature, the liberated acid adds to the oxazoline to form an acid addition salt. The free base is liberated from the salt using an alkaline reagent such as ammonium hydroxide, sodium hydroxide, sodium bicarbonate, calcium oxide, or the like.

With reference to the oxabolines of this invention, it is specifically intended to include within the purview of the invention, the acid addition salts which these compounds form with acids having pharmaceutically acceptable anions. The term, "pharmaceutically acceptable anion" has a definite meaning to one skilled in the art. It is defined as a nontoxic anion of any of the simple acids commercially used to neutralize basic medicinal agents. These acids include, for example, hydrochloric, hydrobromic, hydriodic, sulfuric, succinic, maleic, tartaric, citric, glycolic and others. The pharmaceutical activity of the molecule is primarily a function of the cation, the anion serving chiefly to supply electric neutrality.

By reference to the reaction described above, it can be seen that in the ordinary practice of the process of the invention, the oxazolines produced will be hydrobromides, hydrochlorides, hydriodides, methanesulfonic acids or p-toluenesulfonic acids. These acids can be converted to other pharmaceutically acceptable acids by procedures well known to those skilled in the art. One highly useful method comprises contacting the acid addition salt with a basic anion exchange resin, for example, a highly basic compound such as the one available from Rohm & Haas Company under the name "Amberlite IRA–400." This resin is a polyquaternary ammonium compound which is prepared by chloromethylating a highly cross-linked copolymer of styrene and divinylbenzene followed by treatment of the chloromethylated material with a tertiary amine such as trimethylamine. To prepare an acid addition salt of this invention, for example, the citrate, the resin is first contacted with an aqueous solution of citric acid whereupon an anion exchange takes place converting the quaternary halide to the citrate. The citrate resin is then contacted with an acid addition salt prepared as described above and a further anion exchange takes place converting the acid addition salt to the citrate and leaving the anion of the original salt on the resin. The citrate salt can be recovered from the eluate by a number of methods such as evaporation or solvent precipitation. This same procedure can be used to prepare nitrates, sulfates, acetates and other acid addition salts.

The agents of this invention may be administered alone but are generally administered with a pharmaceutical carrier selected on the basis of the chosen route of administration and standard pharmaceutical practice. For example, they may be administered orally in the form of tablets or capsules containing such excipients as starch, milk sugar, certain types of clay, etc. They may be administered orally in the form of elixirs or oral suspensions which may contain coloring and flavoring agents. They may be injected parenterally and for this use may be prepared in the form of sterile aqueous solutions containing other solutes such as saline or glucose in sufficient quantity to make the solution isotonic. For intramuscular administration compositions of the compounds of this invention may be prepared in an oil base such as peanut or sesame oil.

The compounds of this invention will be administered in a dosage generally of the same or lower order of magnitude as with other pharmaceutical agents having the same type of desired activity. In certain instances it may be found that because of their high order of activity the optimum dosage of the compounds of this invention will be lower than the optimum dosage of other compounds generally recommended for the same use. In general, the physician or veterinarian will determine the dosage which will be most suitable for a particular application, and as might be expected, it will vary with the age, weight and general health of the patient under treatment and with various other factors which will be determined by the physician or veterinarian in attendance. When they are administered orally a larger quantity will be required to produce the same effect as a smaller quantity given parenterally. Parenteral administration of from 0.1 mg. to 250 mg. of active agent should be suitable.

The compositions of this invention may take a variety of forms. Various diluents may be employed and the percentage of active ingredients may be varied. It is necessary that an active ingredient form a proportion of the composition such that a suitable dosage form will be obtained. Obviously several dosage unit forms may be administered at about the same time. Although compositions with less than 0.005% of weight of active ingredient are suitable, it is preferred to use compositions containing not less than 0.005% of the active agent because otherwise the amount of carrier becomes excessively large. Activity increases with the concentration of the active agent. The percentage by weight of active agent may be 10, 50, 75, 95% or even higher. Dosage unit forms may be prepared with a minor proportion of a carrier and a major proportion of active materials and vice-versa.

Administration can be by vapor or spray applications through the mouth or nasal passages.

The following examples are given solely for the purpose of illustration and are not to be construed as limitations of this invention, many variations of which are possible without departing from the spirit or scope thereof.

EXAMPLE 1

To a solution of 14.7 parts by weight of 5,6,7,8-tetrahydronaphthylamine in 150 parts of chloroform is added dropwise at 25° C. a solution of 16.5 parts by weight of 2-bromoethyl isocyanate in 125 parts by weight of chloroform. A white crystalline precipitate appears. After the addition is complete, the mixture is stirred for two hours at room temperature. The solids are collected on a filter, washed with pentane and dried. The product is N-(5,6,7,8-tetrahydro-1-naphthyl) - N' - beta - bromoethylurea, M.P 155–157° C.

EXAMPLE 2

To 1,000 parts by weight of boiling water is added 15 parts by weight of N-(5,6,7,8-tetrahydro-1-naphthyl)-N'-beta-bromoethylurea. The mixture is heated under reflux for 30 minutes after which the nearly clear solution is cooled in an ice bath to room temperature. A small quantity of insoluble material is removed by filtration. The pH of the solution is adjusted to pH 10 by the addition of ammonium hydroxide whereupon a precipitate forms. The precipitate is extracted with three 400 parts by weight portions of chloroform and the combined extracts washed with water. The organic layer is dried over anhydrous sodium sulfate and evaporated in vacuo. The crystalline residue which forms is triturated with ether, collected on a filter and dried. The product, which can be recrystallized from isopropanol, is 2-(5,6,7,8-tetrahydro-1-naphthylamino)oxazoline, M.P. 109–111° C.

The procedures of the preceding examples can be repeated using similar proportions of other starting materials and solvents within the conditions taught herein, as shown in the following, to obtain the indicated exemplary products.

EXAMPLE 3

Amine: 5,6,7,8-tetrahydro-2-chloro-1-naphthylamine
Isocyanate: 2-chloroethyl isocyanate
Urea: N-(5,6,7,8-tetrahydro-2-chloro-1-naphthyl)-N'-beta-chloroethylurea
Oxazoline: 2-(5,6,7,8-tetrahydro-2-chloro-1-naphthylamino)oxazoline

EXAMPLE 4

Amine: 5,6,7,8-tetrahydro-1-naphthylamine
Isocyanate: 2-chloroethyl isocyanate
Urea: N-(5,6,7,8-tetrahydro-1-naphthyl)-N'-beta-chloroethylurea
Oxazoline: 2-(5,6,7,8-tetrahydro-1-naphthylamino)-oxazoline

EXAMPLE 5

Amine: 5,6,7,8-tetrahydro-3,4-dimethyl-1-naphthylamine
Isocyanate: 2-chloroethyl isocyanate
Urea: N-(5,6,7,8-tetrahydro-3,4-dimethyl-1-naphthyl)-N'-beta-chloroethylurea
Oxazoline: 2-(5,6,7,8-tetrahydro-3,4-dimethyl-1-naphthylamino)oxazoline

EXAMPLE 6

Amine: 5,6,7,8-tetrahydro-1-naphthylamine
Isocyanate: 2-iodoethyl isocyanate
Urea: N-(5,6,7,8-tetrahydro-1-naphthyl)-N'-beta-iodoethylurea
Oxazoline: 2-(5,6,7,8-tetrahydro-1-naphthylamino)-oxazoline

EXAMPLE 7

Amine: 5,6,7,8-tetrahydro-1-naphthylamine
Isocyanate: (2-n-butyl-2-chloro)ethyl isocyanate Urea: N-(5,6,7,8-tetrahydro-1-naphthyl)-N'-(2-n-butyl-2-chloro)ethylurea
Oxazoline: 2-(5,6,7,8-tetrahydro-1-naphthylamino)-5-n-butyloxazoline

EXAMPLE 8
Amine: 5,6,7,8-tetrahydro-2-methyl-1-naphthylamine
Isocyanate: (2-methanesulfonyloxy)ethyl isocyanate
Urea: N-(5,6,7,8-tetrahydro-2-methyl-1-naphthyl)-N'-(2-methanesulfonyloxy)ethylurea
Oxazoline: 2-(5,6,7,8-tetrahydro-2-methyl-1-naphthylamino)oxazoline

EXAMPLE 9
Amine: 5,6,7,8-tetrahydro-4-chloro-1-naphthylamine
Isocyanate: (2-p-toluenesulfonyloxy)ethyl isocyanate
Urea: N-(5,6,7,8-tetrahydro-4-chloro-1-naphthyl)-N'-(2-p-toluenesulfonyloxy) ethylurea
Oxazoline: 2-(5,6,7,8-tetrahydro-4-chloro-1-naphthylamino)oxazoline

EXAMPLE 10
Amine: 5,6,7,8-tetrahydro-2,4-diiodo-1-naphthylamine
Isocyanate: 2-iodoethyl isocyanate
Urea: N-(5,6,7,8-tetrahydro-2,4-diiode-1-naphthyl)-N'-beta-iodoethylurea
Oxazoline: 2-(5,6,7,8-tetrahydro-2,4-diiodo-1-naphthylamino)oxazoline

EXAMPLE 11
Amine: 5,6,7,8-tetrahydro-2,5-dibromo-1-naphthylamine
Isocyanate: (1-butyl-2-methanesulfonyloxy)ethyl isocyanate
Urea: N-(5,6,7,8-tetrahydro-2,5-dibromo-1-naphthyl)-N' 1-n-butyl-2-methanesulfonyloxy)ethylurea
Oxazoline: 2-(5,6,7,8-tetrahydro-2,5-dibromo-1-naphthylamino)-4-(n-butyl)oxazoline

EXAMPLE 12
Amine: 1-amino-5,6,7,8-tetrahydro-2,3,4-trimethylthio-1-naphthylamine
Isocyanate: 2-bromoethyl isocyanate
Urea: N-(5,6,7,8-tetrahydro-2,3,4-trimethylthio-1-naphthyl)-N'-(2-bromoethyl)urea
Oxazoline: 2-(5,6,7,8-tetrahydro-2,3,4-trimethylthio-1-naphthylamino)oxazoline

EXAMPLE 13
Amine: 1-amino-5,6,7,8-tetrahydro-2,4,6-trichloro-1-naphthylamine
Isocyanate: (1-n-propyl-2-chloro)ethyl isocyanate
Urea: N-(5,6,7,8-tetrahydro-2,4,6-trichloro-1-naphthyl)-N'-(1-n-propyl-2-chloro)ethylurea
Oxazoline: 2(5,6,7,8-tetrahydro-2,4,6-trichloro-1-naphthylamino)-4-(n-propyl)oxazoline

EXAMPLE 14
Amine: 5,6,7,8-tetrahydro-4-ethyl-1-naphthylamine
Isocyanate: 2-bromoethyl isocyanate
Urea: N-(5,6,7,8-tetrahydro-4-ethyl-1-naphthyl)-N'-(2-bromoethyl)urea
Oxazoline: 2-(5,6,7,8-tetrahydro-4-ethyl-1-naphthylamino)oxazoline

EXAMPLE 15
Amine: 5,6,7,8-tetrahydro-4-fluoro-1-naphthylamine
Isocyanate: (1,1-dimethyl-2-bromo)ethyl isocyanate
Urea: N-(5,6,7,8-tetrahydro-4-fluoro-1-naphthyl)-N'-(1,1-dimethyl-2-bromo)ethylurea
Oxazoline: 2-(5,6,7,8-tetrahydro-4-fluoro-1-naphthylamino)-4,4-dimethyloxazoline

EXAMPLE 16
Amine: 5,6,7,8-tetrahydro-2,4-diethyl-1-naphthylamine
Isocyanate: 2-iodoethyl isocyanate
Urea: N-(5,6,7,8-tetrahydro-2,4-diethyl-1-naphthyl)-N'-(2-iodoethyl)urea
Oxazoline: 2-(5,6,7,8-tetrahydro-2,4-diethyl-1-naphthylamino)oxazoline

EXAMPLE 17
Amine: 5,6,7,8-tetrahydro-2,3-dimethoxy-1-naphthylamine
Isocyanate: (1-methyl-2-p-toluenesulfonyloxy)-ethyl isocyanate
Urea: N-(5,6,7,8-tetrahydro-2,3-dimethoxy-1-naphthyl)-N'-(1-methyl-2-p-toluenesulfonyloxy)ethylurea
Oxazoline: 2-(5,6,7,8-tetrahydro-2,3-dimethoxy-1-naphthylamino)-4-methyloxazoline

EXAMPLE 18
Amine: 5,6,7,8-tetrahydro-2,3,5-tri-sec-butoxy-1-naphthylamine
Isocyanate: 2-bromoethyl isocyanate
Urea: N-(5,6,7,8-tetrahydro-2,3,5-tri-sec-butoxy-1-naphthyl)-N'-(2-bromoethyl)urea
Oxazoline: 2-(5,6,7,8-tetrahydro-2,3,5-tri-sec-butoxy-1-naphthylamino)oxazoline

EXAMPLE 19
Amine: 5,6,7,8-tetrahydro-2,5-dimethylthio-1-naphthylamine
Isocyanate: (1-methyl-2-n-butyl-2-ido)ethyl isocyanate
Urea: N-(5,6,7,8-tetrahydro-2,5-dimethylthio-1-naphthyl)N'-(1-methyl-2-n-butyl-2-iodo)ethylurea
Oxazoline: 2(5,6,7,8-tetrahydro-2,5-dimethylthio-1-naphthylamino)-4-n-methyl-5-(n-butyl)oxazoline

EXAMPLE 20
Amine: 5,6,7,8-tetrahydro-2,5-diethylthio-1-naphthylamine
Isocyanate: (1,2-dimethyl-2-bromo)ethyl isocyanate
Urea: N-(5,6,7,8-tetrahydro-2,5-diethylthio-1-naphthyl)-N'-(1,2-dimethyl-2-bromo)ethylurea
Oxazoline: 2-(5,6,7,8-tetrahydro-2,5-diethylthio-1-naphthylamino)-4,5-dimethyl)oxazoline

EXAMPLE 21
Amine: 5,6,7,8-tetrahydro-2,3-diethoxy-1-naphthylamine
Isocyanate: 2-chloroethyl isocyanate
Urea: N-)5,6,7,8-tetrahydro-2,3-diethoxy-1-naphthyl)-N'-(2-chloroethyl)urea
Oxazoline: 2-(5,6,7,8-tetrahydro-2,3-diethoxy-1-naphthylamino)oxazoline

EXAMPLE 22
Amine: 5,6,7,8-tetrahydro-3,4-dichloro-1-naphtylamine
Isocyanate: 2-bromoethyl isocyanate
Urea: N-(5,6,7,8-tetrahydro-3,4-dichloro-1-naphthyl-N'-(2-bromoethyl)urea
Oxazoline: 2-(5,6,7,8-tetrahydro-3,4-dichloro-1-naphthylamino)oxazoline

EXAMPLE 23
Amine: 5,6,7,8-tetrahydro-3-bromo-1-naphthylamine
Isocyanate: (1-methyl-2-chloro)ethyl isocyanate
Urea: N-(5,6,7,8-tetrahydro-3-bromo-1-naphthyl)-N'-(1-methyl-2-chloro)ethylurea
Oxazoline: 2-(5,6,7,8-tetrahydro-3-bromo-1-naphthylamino)-4-methyloxazoline

EXAMPLE 24
Amine: 5,6,7,8-tetrahydro-3,4,5-triiodo-1-naphthylamine
Isocyanate: (3,4-dimethylphenylsulfonyloxy)ethoxy isocyanate
Urea: N-(5,6,7,8-tetrahydro-3,4,5-triiodo-1-naphthyl)-N'-(1,2-dimethylphenylsulfonyloxy)ethylurea
Oxazoline: 2-(5,6,7,8-tetrahydro-3,4,5-tetrahydro-1-naphthylamino)-4,5-dimethyloxazoline

EXAMPLE 25

Amine: 5,6,7,8-tetrahydro-4-isopropyl-1-naphthylamine
Isocyanate: 2-bromoethyl isocyanate
Urea: N-(5,6,7,8-tetrahydro-4-isopropyl-1-naphthyl)-N'-(2-bromoethyl)urea
Oxazoline: 2-(5,6,7,8-tetrahydro-4-isopropyl-1-naphthylamino)oxazoline

EXAMPLE 26

Amine: 5,6,7,8-tetrahydro-2,4-difluoromethyl-1-naphthylamine
Isocyanate: 2-bromoethyl isocyanate
Urea: N-(5,6,7,8-tetrahydro-2,4-difluoromethyl-1-naphthyl)-N'-(2-bromoethyl)urea
Oxazoline: 2-(5,6,7,8-tetrahydro-2,4-tetrahydro-1-naphthylamino)oxazoline

EXAMPLE 27

Amine: 5,6,7,8 - tetrahydro - 4 - trifluoromethoxy - 1 - naphthylamine
Isocyanate: 2 - bromoethyl isocyanate
Urea: N - (5,6,7,8 - tetrahydro - 4 - trifluoromethoxy - 1 - naphthyl) - N' - (2 - bromoethyl)urea
Oxazoline: 2 - (5,6,7,8 - tetrahydro - 4 - trifluoromethoxy-1-naphthylamino)oxazoline

EXAMPLE 28

Amine: 4-indanylamine
Isocyanate: 2-bromoethyl isocyanate
Urea: N - (4 - indanyl) - N' - (beta - bromoethyl)urea
Oxazoline: 2-(4-indanylamino)oxazoline

EXAMPLE 29

Amine: 2-chloro-4-indanylamine
Isocyanate: 2-chloroethyl isocyanate
Urea: N - (2 - chloro - 4 - indanyl) - N' - beta-chloroethylurea
Oxazoline: 2 - (2 - chloro - 4 - indanylamino)oxazoline

EXAMPLE 30

Amine: 2,5-diiodo-4-indanylamine
Isocyanate: (2-p-toluenesulfonyloxy)ethyl isocyanate
Urea: N - (2,5 - diiodo - 4 - indanyl) - N' - (2 - p - toluenesulfonyloxy)ethylurea
Oxazoline: 2-(2,5-diiodo-4-indanylamino)oxazoline

EXAMPLE 31

Amine: 3,5 - di - (n - propylthio) - 4 - indanylamine
Isocyanate: (1-methyl-2-chloro)ethyl isocyanate
Urea: N - [3,5 - di - (n - propylthio) - 4 - indanyl) - N' - (1-methyl-2-chloro)ethylurea
Oxazoline: 2 - [3,5 - di - (n - propylthio) - 4 - indanylamino]oxazoline

EXAMPLE 32

Amine: 4-indanylamine
Isocyanate: 2-chloroethyl isocyanate
Urea: N - (4 - indanyl) - N' - (beta - chloroethyl)urea
Oxazoline: 2-(4-indanylamino)oxazoline

EXAMPLE 33

Amine: 4-indanylamine
Isocyanate: 2-iodoethyl isocyanate
Urea: N-(4-indanyl)-N'-(beta-iodoethyl)urea
Oxazoline: 2-(4-indanylamino)oxazoline

EXAMPLE 34

Amine: 4-indanylamine
Isocyanate: (2-n-butyl-2-chloro)ethyl isocyanate
Urea: N - (4 - indanyl) - N' - (2-n-butyl-2-chloro)ethylurea
Oxazoline: 2-(4-indanylamino)oxazoline

EXAMPLE 35

Amine: 2-methyl-4-indanylamine
Isocyanate: (2-methanesulfonyloxy)ethyl isocyanate
Urea: N - (2 - methyl - 4 - indanyl) - N' - (2 - methanesulfonyloxy)ethylurea
Oxazoline: 2 - (2 - methyl - 4 - indanylamino)oxazoline Other compounds and their acid addition salts can readily be prepared in accordance with the above teachings herein.

The invention claimed is:

1. A compound selected from the group consisting of those of the formulas:

(1) 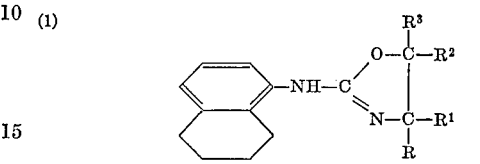

(2) 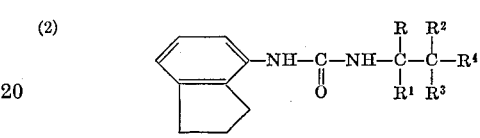

(3) 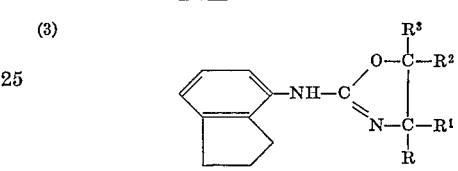

where R, $R^1$, $R^2$ and $R^3$ are each selected from the group consisting of hydrogen and alkyl of 1 through 4 carbon atoms with the carbons in R, $R^1$, $R^2$ and $R^3$ totalling a maximum of 8 carbons; and where $R^4$ is selected from the group consisting of halogen, alkylsulfonyloxy wherein said alkyl has 1–4 carbons, and arylsulfonyloxy wherein said aryl is of 6–8 carbons; and where up to three hydrogen atoms of the reduced naphthyl group and the indanyl group of said compound can be replaced by a substituent selected from the group consisting of halogen, alkyl of 1–4 carbons, alkoxy of 1–4 carbons, alkylthio of 1–4 carbons, trifluoromethyl and trifluoromethoxy; and pharmaceutically acceptable acid addition salts of said compounds of Formulas 1 and 3.

2. A partially reduced 2-(1-naphthylamino)oxazoline of the formula:

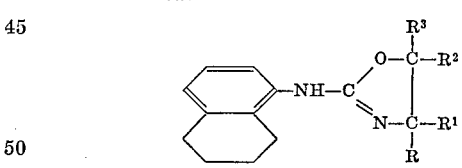

where R, $R^1$, $R^2$ and $R^3$ are each selected from the group consisting of hydrogen and alkyl of 1 through 4 carbon atoms with the carbons in R, $R^1$, $R^2$ and $R^3$ totalling a maximum of 8 carbons; and where up to three hydrogen atoms of the reduced naphthyl group of said oxazoline can be replaced by a substituent selected from the group consisting of halogen, alkyl of 1–4 carbons, alkoxy of 1–4 carbons, alkylthio of 1–4 carbons, trifluoromethyl and trifluoromethyoxy; and pharmaceutically acceptable acid addition salts of said oxazoline.

3. A N-(4-indanyl)-N'-(beta-substituted ethyl)urea of the formula:

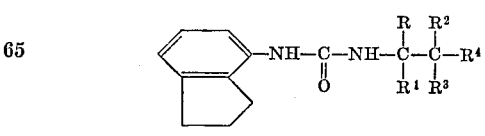

where R, $R^1$, $R^2$ and $R^3$ are each selected from the group consisting of hydrogen and alkyl of 1 through 4 carbon atoms with the carbons in R, $R^1$, $R^2$ and $R^3$ totalling a maximum of 8 carbons; and where $R^4$ is selected from the group consisting of halogen, alkylsulfonyloxy wherein said alkyl has 1–4 carbons, and arylsulfonyloxy wherein said aryl is of 6–8 carbons; and where up to three hydrogen atoms of the indanyl group of said urea can be replaced by a substituent selected from the group consisting of halogen, alkyl of 1–4 carbons, alkoxy of 1–4 carbons, alkylthio of 1–4 carbons, trifluoromethyl and trifluoromethoxy.

4. A 2-(4-indanylamino)oxazoline of the formula:

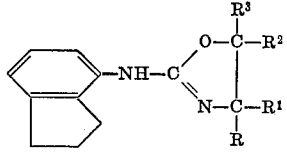

where R, R¹, R² and R³ are each selected from the group consisting of hydrogen and alkyl of 1 through 4 carbon atoms with the carbons in R, R¹, R² and R³ totalling a maximum of 8 carbons; and where up to three hydrogen atoms of the indanyl group of said oxazoline can be replaced by a substituent selected from the group consisting of halogen, alkyl of 1–4 carbons, alkoxy of 1–4 carbons, alkylthio of 1–4 carbons, trifluoromethyl and trifluoromethoxy; and pharmaceutically acceptable acid addition salts of said oxazoline.

5. 2-(5,6,7,8-tetrahydro-1-naphthylamino)oxazoline.

6. 2-(5,6,7,8-tetrahydro-1-naphthylamino)oxazoline hydrobromide.

7. 2-(5,6,7,8-tetrahydro-1-naphthylamino)oxazoline hydrochloride.

8. N-(4-indanyl)-N'-(beta-bromoethyl)urea.

9. 2-(4-indanylamino)oxazoline.

10. 2-(4-indanylamino)oxazoline hydrobromide.

11. 2-(4-indanylamino)oxazoline hydrochloride.

12. N-(4-indanyl)-N'-(beta-chloroethyl)urea.

13. N-(4-indanyl)-N'-(beta-iodoethyl)urea.

14. Method comprising administering a central nervous system depressing amount of a compound defined in claim 1 to a warm-blooded animal.

15. A pharmaceutical composition containing a pharmacologically active amount of a compound according to claim 1 in a pharmaceutically acceptable carrier.

References Cited

UNITED STATES PATENTS

| | | | |
|---|---|---|---|
| 2,811,529 | 11/1957 | Bloom | 260—307 |
| 2,870,159 | 1/1959 | Bloom | 260—307 |
| 2,870,161 | 1/1959 | Bloom | 260—307 |
| 2,883,410 | 4/1959 | Bloom | 260—456 |
| 2,889,351 | 6/1959 | Bloom | 260—456 |

LELAND A. SEBASTIAN, *Primary Examiner.*

U.S. Cl. X.R.

260—307, 553; 424—322